United States Patent [19]
Arndt et al.

[11] Patent Number: 5,724,510
[45] Date of Patent: Mar. 3, 1998

[54] METHOD OF CONFIGURING A VALID IP ADDRESS AND DETECTING DUPLICATE IP ADDRESSES IN A LOCAL AREA NETWORK

[75] Inventors: Manfred Ruediger Arndt; Frank John Actis, both of Colorado Springs, Colo.

[73] Assignee: Fluke Corporation, Everett, Wash.

[21] Appl. No.: 709,346

[22] Filed: Sep. 6, 1996

[51] Int. Cl.⁶ .................................................. G06F 13/00
[52] U.S. Cl. ........................... 395/200.5; 395/200.54; 395/200.75; 370/252; 370/453
[58] Field of Search ................. 395/200.1, 200.11, 395/200.12, 200.16; 370/252, 443, 453, 462, 475; 340/825, 825.5, 825.52, 825.53

[56] References Cited

U.S. PATENT DOCUMENTS

| | | | |
|---|---|---|---|
| 4,689,786 | 8/1987 | Sidhu et al. | 370/94 |
| 4,825,204 | 4/1989 | Nakamura | 340/825.52 |
| 5,150,464 | 9/1992 | Sidhu et al. | 395/200.1 |
| 5,159,592 | 10/1992 | Perkins | 370/85.7 |
| 5,229,988 | 7/1993 | Marbaker et al. | 370/13 |
| 5,283,571 | 2/1994 | Yang et al. | 340/825.52 |
| 5,327,534 | 7/1994 | Hutchison et al. | 395/200.1 |
| 5,446,897 | 8/1995 | Mathias et al. | 395/700 |
| 5,459,713 | 10/1995 | Curtis | 370/13 |
| 5,526,489 | 6/1996 | Nilakantan et al. | 395/200.02 |
| 5,530,896 | 6/1996 | Gilbert | 395/829 |
| 5,557,748 | 9/1996 | Norris | 395/200.1 |
| 5,586,269 | 12/1996 | Kubo | 395/250 |

Primary Examiner—Parshotam S. Lall
Assistant Examiner—Saleh Najjar
Attorney, Agent, or Firm—Douglas J. Barker

[57] ABSTRACT

In a local area network (LAN) test instrument, a method for detecting duplicate internet protocol (IP) addresses without disrupting the LAN is provided. The LAN test instrument provides a method of choosing an IP address for itself without disrupting the ARP caches of devices connected to the LAN. Duplicate IP addresses between devices on the LAN may then be tested using a series of network broadcasts chosen to elicit responses from as many nodes on the network as possible because some nodes respond to some types of broadcasts and not others. A data base of the various nodes is collected and the newly arriving responses are dynamically compared with the responses already in the data base to detect duplicate IP addresses. Separate entries in the data base for devices having duplicate IP addresses are maintained and then displayed to the user of the LAN test instrument to selectably and reliably communicate with the devices having duplicate IP addresses for further diagnosis and correction.

8 Claims, 7 Drawing Sheets

| FIG. 5A |
| FIG. 5B |

METHOD OF CONFIGURING A VALID IP ADDRESS AND DETECTING DUPLICATE IP ADDRESSES IN A LOCAL AREA NETWORK

BACKGROUND OF THE INVENTION

This invention relates generally to local area network (LAN) test equipment and in particular to a method for configuring a valid internet protocol (IP) address for a LAN test instrument and detecting duplicate IP addresses between devices in a LAN.

Increasingly complex LANs now connect more and more types of devices including personal computers, work stations, file servers, and printers. Network hubs are often the central devices in a network through which information flows. Each client device connects to the LAN via adapters called network interface cards (NICs) to form nodes. Connecting the nodes to the hubs are network links which may be unshielded twisted pair (UTP) wire, coaxial cable, or fiber optic cable.

Network protocols for controlling the communication of information between the nodes have been developed, including Ethernet which is defined according to the IEEE 802.3 standard and Token Ring which is defined according to the IEEE 802.5 standard. Ethernet uses a method called carrier-sensing multiple access with collision detection (CSMA/CD) to control information flow and resolve collisions between nodes. A node can send information on the network only if no other node is currently sending information. If a node tries to send information at the same time as another node, a collision occurs and each node operates according to a defined "back off" procedure to resolve the collision. Each node will wait a random period of time to attempt to send the information again.

Because Ethernet is typically implemented in a baseband, broadcast network, every node receives the information sent by every other node within the collision domain. In order to minimize the burden on the software operating in host personal computers (PC's) connected to the network, a hardware layer with a hardware or media access control (MAC) address passes along to the software layer only the information appropriate for that node. Such information may be in the form of a "broadcast" message intended for all nodes in the network or as a message only for the intended node with the MAC address.

Information sent over an Ethernet network is in the form of discrete packets defined according to the seven layer Open Systems Interconnection (OSI) standard maintained by the American National Standards Institute (ANSI). OSI is a layered structure in which the highest layers take advantage of the capabilities of the lower layers to send information between nodes. Information is passed between nodes in the form of discrete packets containing data or control information supplied by the various OSI layers. The highest layers are the Application layer, the Presentation layer, and the Session layer which may include Telnet, File Transfer Protocol (FTP), Simple Mail Transfer Protocol (SNMP), and Domain Name System (DNS).

The Transport layer typically includes the Transmission Control Protocol (TCP) along with the User Datagram Protocol (UDP), among others, which provide for the delivery of the data to a desired device and the division of the information into discrete packets for sending. Received packets are reassembled in a like manner. The Network layer routes messages back and forth between a source node and a destination node according to Internet Protocol (IP) addresses by adding an IP header to each packet indicating the source and destination IP addresses. The lowest layer is the physical link layer in which the hardware MAC addresses are used.

Maintaining unique MAC and IP addresses for each node is critical for proper functioning of the network. MAC addresses are commonly understood to be 48 bits in length while IP addresses are 32 bits in length. MAC addresses are hardware addresses, not readily changeable, which are assigned according to the manufacturer in the manner of a serial number. Duplicate MAC addresses thus rarely present any problems in actual applications.

IP addresses, on the other hand, are designed to be changed dynamically. IP addresses are often assigned when a client PC is booted up on the LAN and an IP address is often allocated to the client by a dynamic host configuration protocol (DHCP) server or a boot protocol (BOOTP) server. Such an allocation method uses a table of predetermined unique IP addresses which usually avoids the problem of duplicate IP addresses. However, duplicate IP addresses continue to occur, particularly in network devices that do not go through the boot-up process in which the IP address would normally be allocated, such as printers or routers.

Various methods have been devised for detecting and correcting duplicate IP addresses between devices in a LAN. Some of these methods are limited in scope with the ability to detect duplicate IP addresses only on the local segment of the LAN and may disrupt the reliable operation of the LAN. Prior art LAN test instruments exist that detect duplicate IP addresses operate in a similar fashion to the above example. A given IP address may be tested for duplication by sending an address resolution protocol (ARP) request and waiting for a reply. If no reply is received, there is likely no duplication. However, in determining which IP addresses to test for, the prior art LAN test instruments either provide no facility to automatically find IP addresses to test for but instead allow only for incrementally testing a range of IP addresses one at a time or a limited facility in which ARP caches are collected from various devices in the LAN in a passive manner to obtain IP addresses.

Therefore, it would be desirable to provide a LAN test instrument that may be inserted into a LAN system which has the ability to select a valid IP address for itself without disrupting normal network operations. It would be further desirable to provide a method in a LAN test instrument that has a greater ability to automatically find and identify duplicate IP addresses than existing methods.

SUMMARY OF THE INVENTION

In accordance with the present invention, a method for configuring a valid internet protocol (IP) address for a LAN test instrument inserted in a LAN without disrupting the LAN is provided. The LAN test instrument is inserted into the LAN, which may be an Ethernet, Token Ring, or other communications protocol, either at boot up or by physical connection to the live network. The test instrument monitors network traffic on the local network segment for a predetermined period of time to determine top address ranges. From the traffic information collected, the LAN test instrument can identify the most prevalent local addresses on the local network segment and also identify routers which most commonly use RIP (router interface protocol) or OSPF (open shortest path first) protocols. From the local address ranges, the LAN test instrument may either choose an unused IP address or prompt a user to choose an unused IP address within the local address range.

Once an IP address for the LAN test instrument has been chosen by the user, duplicate IP address checking is performed. It is critical that no disruption to the normal operation of the LAN occur due to the insertion of the LAN test instrument and the user's choice of an IP address that turns out to be a duplicate of another device currently on the LAN. ARP (address resolution protocol) caches, temporary memory for storing the responses to ARP requests on the local segment, are updated with each ARP request received and are thus subject to corruption due to duplicate IP detection by conventional means.

The method according to present invention provides for duplicate IP testing using a predetermined, unique source IP address for the sender IP address and the target address of the desired IP address for an ARP request to avoid corrupting the ARP caches of the other hosts on the network with invalid addresses, and also to avoid generating console error messages and log file errors. In the preferred embodiment, the predetermined, unique source IP address is one reserved to the manufacturer of the LAN test instrument and therefore known not to be local to the LAN being tested.

If no reply is received by the LAN test instrument, a second ARP request with the desired IP address as both sender and target IP addresses, commonly known as a gratuitous ARP, is sent and replies will be monitored for by the LAN test instrument. When the desired IP address has been verified by the LAN test instrument, the desired IP address is adopted as the IP address of the LAN test instrument.

The method according to the present invention further provides for automatically detecting duplicate IP addresses between devices on the network by generating a series of network broadcast requests and dynamically comparing each response to past responses stored in a data base in the LAN test instrument. Because some devices on the LAN may respond to some types of network broadcast requests and not others, the series of network broadcast requests consists of various types chosen to elicit responses from as many devices as possible on any given LAN. The number and mix of types may be arrived at by reasonable experimentation given the present mix of devices on the LAN. As each of the responses are received by the LAN test instrument, the address information contained in the response is dynamically compared to the information from past responses in the data base to detect duplicate IP addresses. The data base maintains separate entries for each device having duplicate IP addresses, allowing the user to reliably select and communicate with the devices having a duplicate IP addresses for purposes of further diagnosis and correction.

One object of the present invention is to provide a method for automatically configuring a valid IP address for a LAN test instrument.

Another object of the present invention is to provide a method for detecting duplicate source IP addresses without disrupting the operation of a LAN.

An additional object of the present invention is to provide a method for detecting duplicate IP addresses and reliably communicating with selected devices having the duplicate IP addresses in a LAN.

A further object of the present invention is to provide a LAN test instrument capable of being inserted into a LAN to detect a duplicate IP addresses without disrupting the operation of the LAN.

Other features, attainments, and advantages will become apparent to those skilled in the art upon a reading of the following description when taken in conjunction with the accompanying drawings.

DETAILED DESCRIPTION OF THE INVENTION

Figure 1:
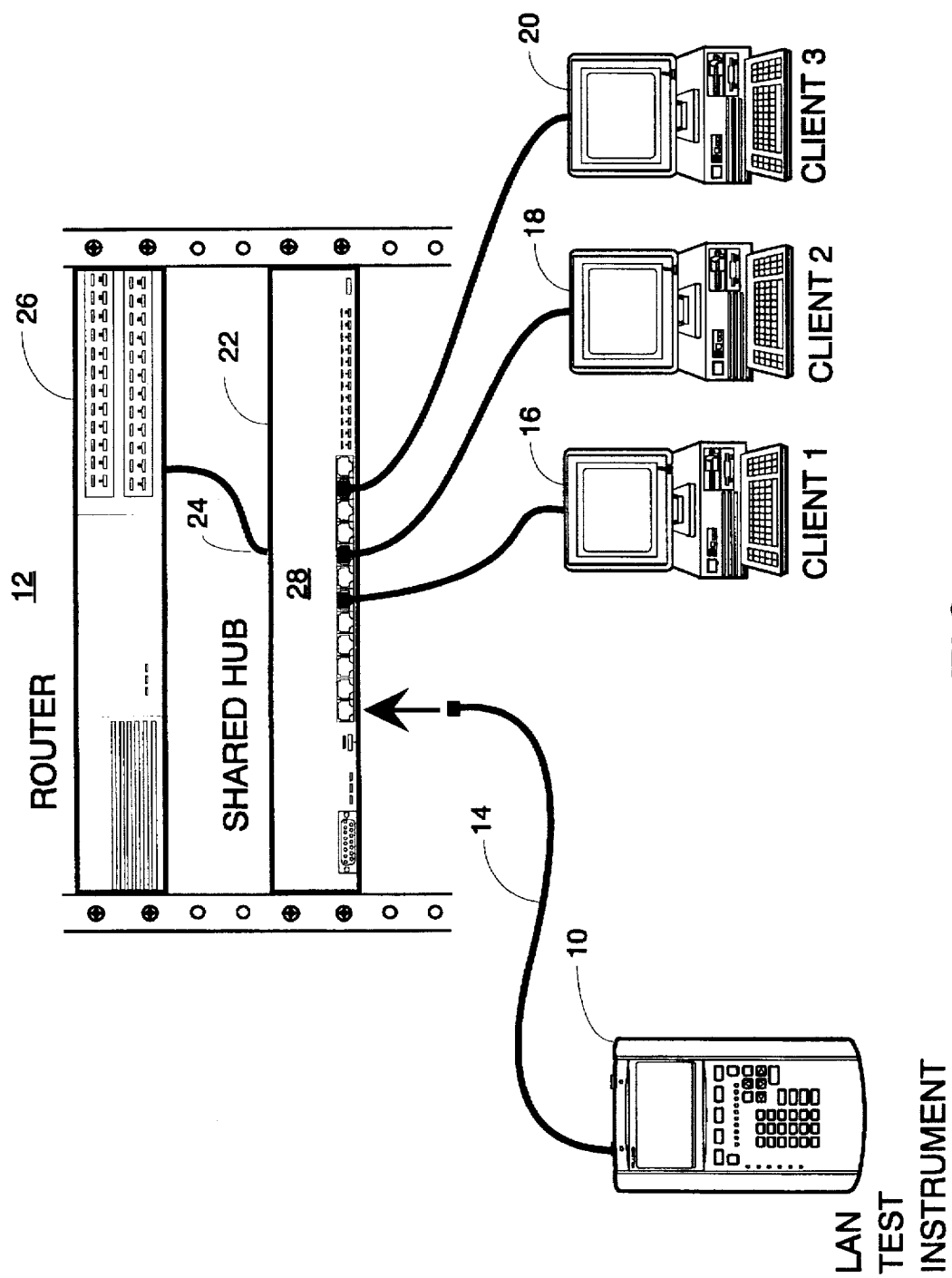
FIG. 1 is an illustration (not to scale) showing a typical situation in which a LAN test instrument is inserted into a LAN to detect duplicate IP addresses.

FIG. 1 is an illustration (not to scale) of a typical situation in which a LAN test instrument 10 according to the present invention is inserted into a LAN (local area network) 12 via a patch cable 14 to detect duplicate IP addresses, first between a desired IP address of the LAN test instrument 10 and any node in the LAN 12 and then between any pair of nodes within the LAN 12. The LAN 12 may comprise any number of physical hardware components including a router 26 and shared hub 22 for connecting clients 16, 18, and 20. The clients 16, 18, and 20 are coupled to the shared hub 22 via ports 28. The shared hub 22 is further coupled via a cable 24 to a port on the router 26 which provides connections to other areas of the LAN 12 (not shown). Other commercially available network hardware including repeaters, switching hubs, bridges, and media access units (MAUs) may be included within the LAN 12. The LAN 12 thus comprises a system of hardware and cables to form the physical layer according to the well-known Open Systems Interconnection (OSI) model.

Each of the clients 16, 18, and 20 have network adapters commonly referred to as network interface cards (NICs) for hardware connection to the LAN 12. Each of the clients has a physical hardware address commonly referred to as the media access control (MAC) or hardware address. The hardware layer operates as a filter that passes only messages received from the network that are broadcast messages or addressed to that particular MAC address. Because MAC addresses are assigned according to manufacturers by industry-wide agreement and in the form of a unique serial number for each hardware device, duplication of MAC addresses is not a concern. The ports of the router also have MAC addresses that operate in a similar manner to those of the clients 16, 18, and 20.

Each of the clients 16, 18, and 20 further have IP addresses that operate on the software or network level. Although many clients have statically-configured IP addresses, such IP addresses are readily assignable by the network administrator and are sometimes assigned at boot up by the BOOTP or DHCP server (not shown) on the LAN which maintains a pool of unique IP address to draw from. IP addresses for any particular client may change each time the device is booted up on the network. For the LAN 12 to operate properly, each device on the network, including the clients 16, 18, and 20 as well as each of the ports of the router 26, must have a unique IP address at any given time.

The physical hardware responds only to a specific MAC address or the MAC broadcast (0xFFFFFFFFFFFF) thus acting as a filter which reduces the burden on the software layer in each of the clients 16, 18, and 20. It is necessary that an ARP (address resolution protocol) request be broadcast to dynamically map IP addresses to corresponding MAC addresses. Broadcasts such as ARP commands typically must be minimized because the physical hardware of every device on the LAN receiving the broadcast passes the broadcast along to its respective software layer. Although an ARP request may be broadcast for each time that data must be transferred from one device on the network to another, such requests are relatively inefficient and cause excessive broadcast traffic. Alternatively, ARP caches within each of the clients 16, 18 and 20 and the router 26 for temporarily storing IP to MAC address maps may be used to minimize the number of ARP commands sent. The entries in the ARP cache each containing an IP to MAC address mapping are usually set by default option to expire after 20 minutes.

Figure 2:
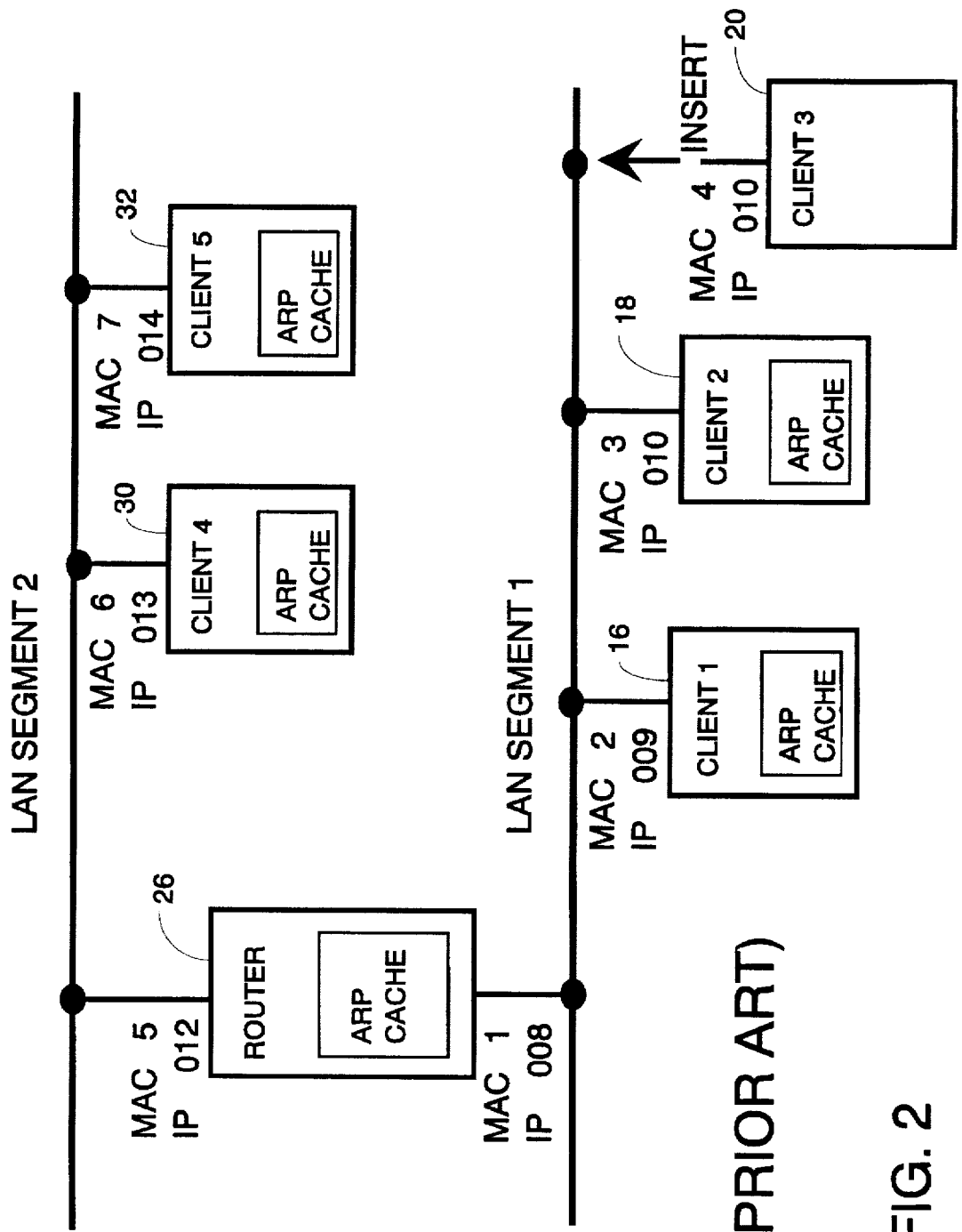
FIG. 2 is a simplified block diagram of the LAN in which a misconfigured client having a duplicate IP address is inserted into the LAN.

It has been recognized in the LAN field that duplicate IP addresses can and still do occur in LANs and that it is desirable to provide means for detecting and correcting for duplicate IP addresses between network devices. FIG. 2 is a simplified block diagram of the LAN 12 in which a misconfigured client 20 having a duplicate IP address of 010 is inserted into the LAN 12. Such insertion can be either the physical plugging in of the client 20 into one of the ports 28 of the shared hub 22 or the booting up of the client 20 already connected to the LAN 12. Each of the clients 16, 18, and 20 are on the same LAN SEGMENT 1 which is provided by the shared hub 22. The router 26 provides a pathway to a LAN SEGMENT 2 which has clients 30 and 32 connected.

Each of the clients 16, 18, and 20 contain an ARP cache which contains the entries that each map an IP address to a MAC address and that are obtained through ARP requests, either by the client itself or are updated by other ARP requests from other devices on the same LAN segment if the entry already exists. The router 26 does not relay ARP requests to other segments but may answer for the clients 30 and 32 if the router 26 has Proxy ARP capability as is commonly known in the art.

Within any given segment of the LAN 12, including the LAN SEGMENT 1 and LAN SEGMENT 2 as shown, there may be blocks of IP addresses assigned that define local subnets according to subnet masks. Clients in one local subnet are generally more closely associated with each other than with clients on another local subnet. For example, local subnets may be assigned according to different work groups within an organization to simplify network administration tasks. A subnet broadcast may be created that targets all of the clients configured for one local subnet but is not received by clients configured for another local subnet.

Figure 3:
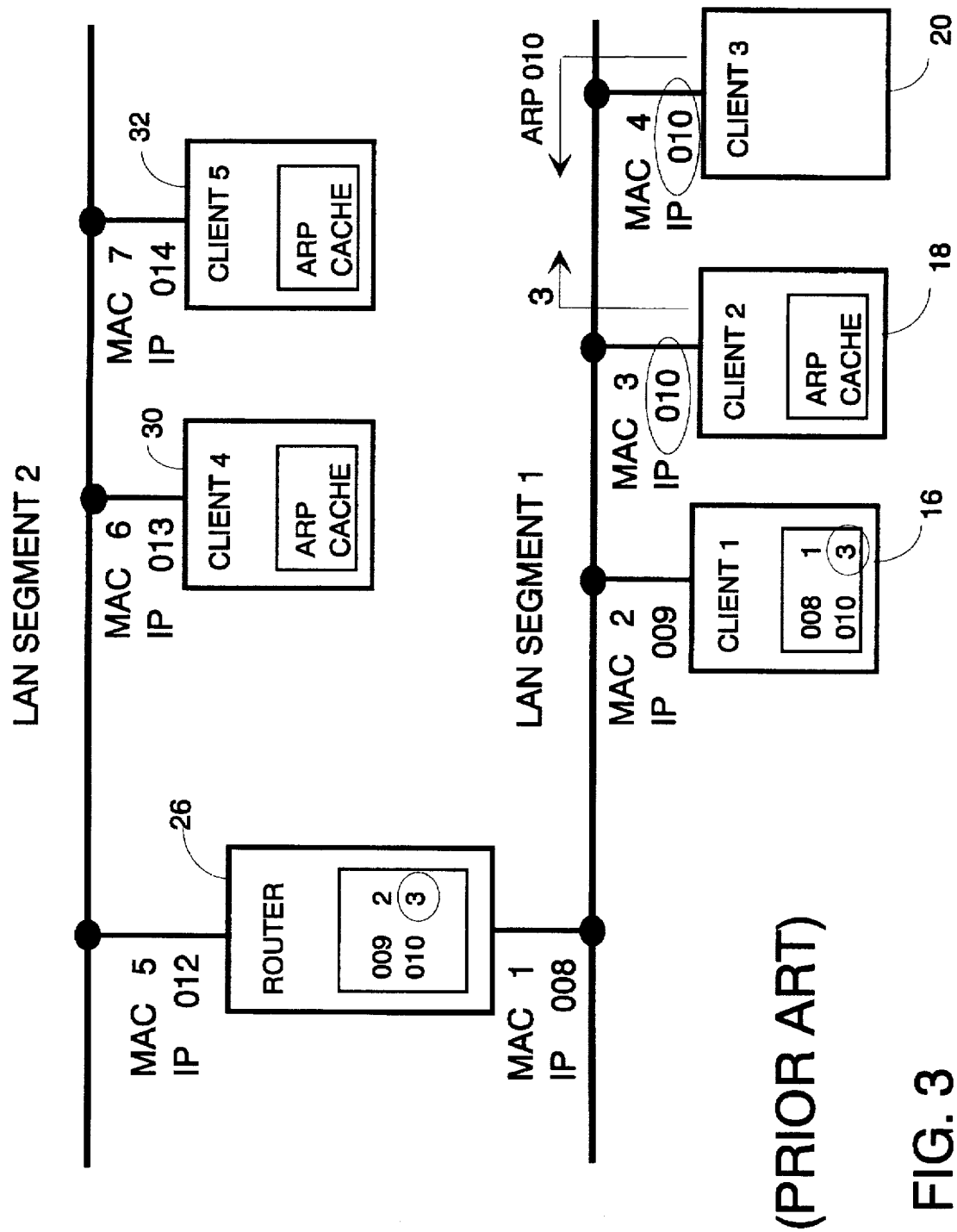
FIG. 3 is a simplified block diagram of the LAN of FIG. 2 showing the effect on the ARP caches of nodes caused by the misconfigured client.

FIG. 3 shows the operation of the LAN network 12 according to a prior art protocol for detecting duplicate source IP addresses. The client 20 is misconfigured in that its IP address of 010 is the same IP address as the client 18 which is already connected to the network. Upon boot-up, the client 20 sends out a gratuitous ARP request with its own IP address of 010 to determine if its source IP address is already in use by another client. In doing so, the client 18, having the same IP address of 010 responds to the ARP request. The client 20, upon seeing the response from client 18, will automatically disconnect from the network or provide an error message to the network manager indicating the duplicate IP address problem so that it may be resolved.

However, in generating the gratuitous ARP, the ARP caches of the client 16 and the router 26 have been corrupted with the MAC address of the client 20, now disconnected, instead of the client 18, which remains properly connected. In the ARP tables of the router 26 and the client 16, the MAC address of 3, shown in the circle, would be replaced with the improper MAC address of 4. The result of this corruption of the ARP caches is short-term disruption of communications with the client 18 until the ARP caches are refreshed. Furthermore, this method according to the prior art is not completely reliable in that some clients do not perform gratuitous ARPs and will continue to use a duplicate source IP address, causing disruption in the LAN until the problem is eventually found and resolved manually.

Prior art LAN test instruments exist that detect duplicate target IP addresses operate in a similar fashion to the above example. A given IP address may be tested for duplication by sending an ARP request and waiting for a reply. If multiple replies are received, then there is probably a duplicate IP address between several devices in the LAN 12. However, in determining which IP addresses to test for a duplicate IP address, some prior art LAN test instruments provide no facility to automatically find such IP addresses but instead allow only for incrementally testing a range of IP addresses one at a time. Other prior art LAN test instruments may instead provide a limited facility to obtain IP addresses to test in which ARP caches are collected from various devices in the LAN 12 in a passive manner to obtain the IP addresses.

Figure 4:
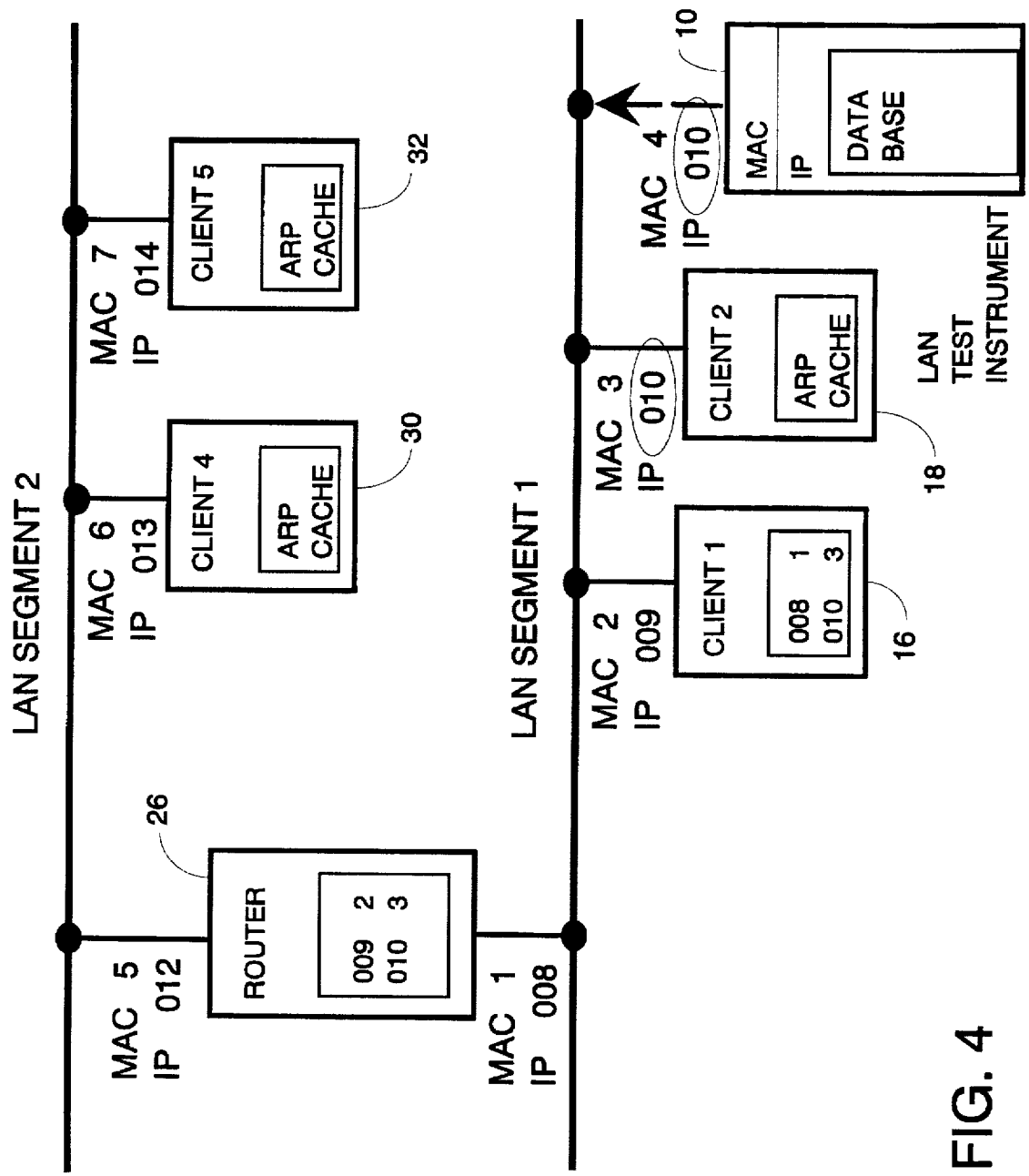
FIG. 4 is a simplified block diagram of the LAN of FIG. 2 in which the LAN test instrument according to the present invention is inserted into the LAN to detect duplicate addresses.

FIG. 4 shows the same LAN 12 as in FIG. 3 but with the LAN test instrument 10 being inserted in place of the client 20 as shown. The LAN test instrument 10 must first be configured with an IP address that is compatible with the remaining portions of the LAN 12. It is often desirable that the IP address of the LAN instrument 10 can be readily configurable by the user for diagnostic purposes, such as to substitute the LAN test instrument 10 for another device with the same IP address. It is also desirable that the user have some guidance in choosing a proper IP address by providing the local subnet address range to be compatible the other devices on the same LAN segment. After the user has chosen an IP address, the LAN test instrument 10 checks for duplicate IP addresses in a manner that does not corrupt the ARP caches of other devices as explained in further detail below.

After it has been established that there are no duplicate IP addresses between the LAN test instrument 10 and other clients on the local subnet, further analysis is conducted to detect duplicate IP addresses between other client within the LAN 12. A series of network broadcast requests are sent that consist of various types which include an ICMP (internet control message protocol) ping, an ICMP address mask request, a UDP ping and an SNMP (simple network management protocol) ping. The number and mix of the types of network broadcast requests are chosen is designed to elicit replies from as many devices as possible from as many subnets as possible from the LAN SEGMENT 1. Some devices respond to some network broadcast requests but not others. Many devices do not advertise their presence on the LAN 12, such as passive routers or printers, and such devices must be affirmatively prompted using the appropriate network broadcast requests. The number and composition of the types in the series of network broadcast requests according to the present invention may be readily expanded and modified using a reasonable amount of experimentation to accommodate different types of network devices as they are developed.

As each of the responses from each network request are received, a data base is constructed containing MAC and IP addresses of the responding devices as well as further information as to the type of device. Unlike the ARP cache, however, the incoming responses from the network devices are analyzed in a dynamic fashion and compared against the data base to detect duplicate IP addresses. Duplicate IP addresses that are detected are then displayed to the user of the LAN test instrument 10 and further information obtained from the data base is provided to allow for diagnosis of the network devices having the duplicate IP addresses.

The data base according to the present invention allows for more readily diagnosing duplicate IP addresses and more reliably communicating with the devices that have the duplicate IP addresses than prior art methods using only ARP caches. Separate entries in the data base are maintained for each MAC address of the devices having duplicate IP addresses, allowing for directed communications such as SNMP queries to the selected devices in spite of the duplicate IP problem in order to identify the misconfigured devices. In this way, duplicate IP addresses may be further analyzed and corrected if necessary by remote commands to the selected devices on the LAN.

Figures 5, 5A:
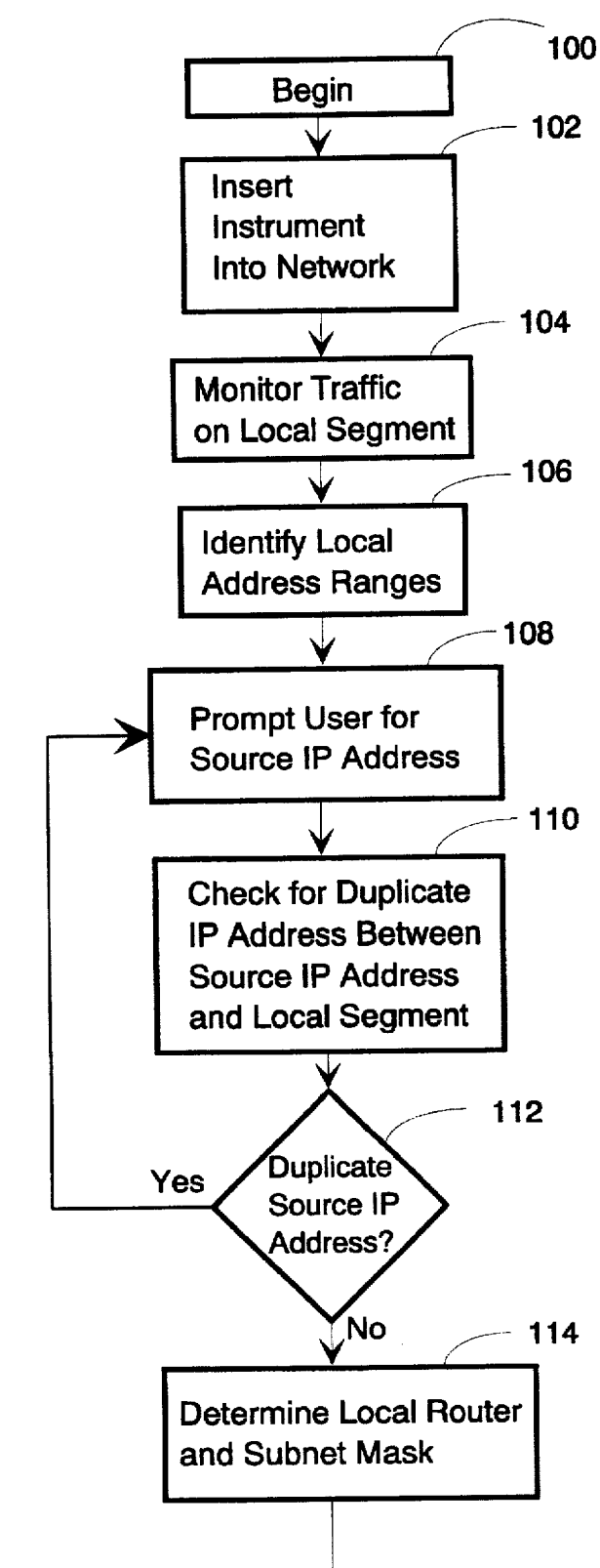
FIG. 5 which includes FIGS. 5A and 5B together comprise a flow diagram of the process of inserting the LAN test instrument into the LAN to detect duplicate IP addresses according to the present invention.
Figure 5B:
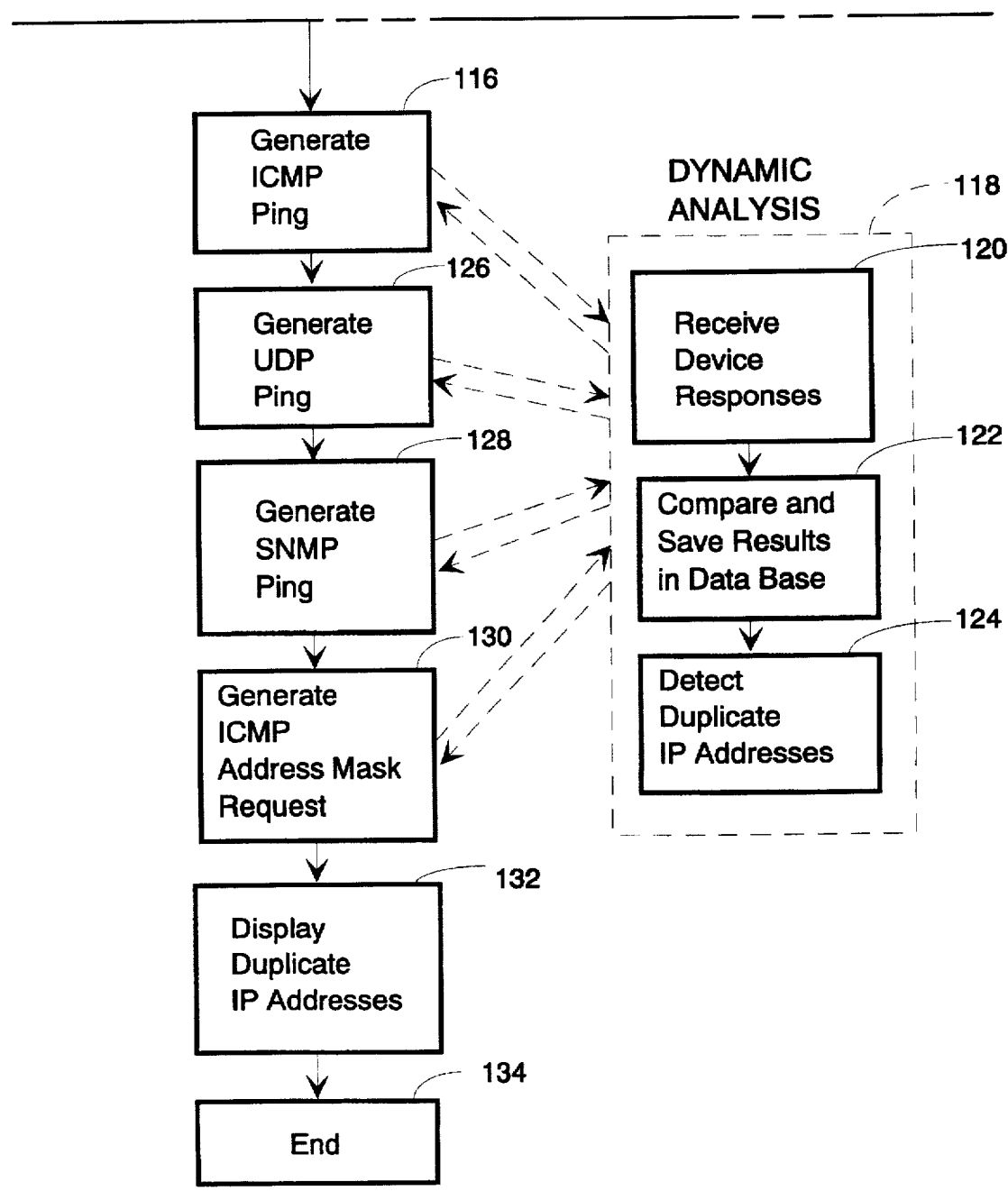

FIGS. 5A and 5B together comprise a flow diagram of a process according to the present invention of inserting the LAN test instrument into the LAN with a proper IP address and then sending a series of network requests to detect duplicate IP addresses between devices on the network.

Referring now to FIG. 5A, there is shown the step 100 labeled Begin in which it is desired that the LAN test instrument 10 (shown in FIG. 1) be connected to the LAN 12 for diagnostic purposes. The LAN test instrument 10 may be connected directly to the shared hub 22 via the patch cable 14 or to a wall outlet in a user area that connects to the LAN 12 via a longer link cable (not shown).

In step 102 labeled Insert Instrument Into Network, the LAN test instrument 10 is either physically connected to the LAN 12 or booted-up on the LAN 12. LAN 12 may be running Token Ring, Ethernet, or another network protocol which operates according to a baseband, broadcast principle in which devices have unique hardware and software addresses. The precise method of insertion thus varies according to the particular protocol of the network but is typically done in the conventional manner for Ethernet or Token Ring.

In step 104 labeled Monitor Traffic on Local Segment, the LAN test instrument 10 passively monitors the data traffic being sent by other devices on the local segment, in this case LAN SEGMENT 1 for a predetermined period of time. The LAN test instrument 10 operates with its hardware interface in promiscuous mode, which is commonly understood to mean that all network traffic is passed to the software layer for analysis.

In step 106 labeled Identify Local Address Ranges, the LAN test instrument 10 analyzes the data traffic collected in step 104 to determine the address ranges of the devices used on the local segment of the LAN 12.

In step 108 labeled Prompt User for IP Address, the LAN test instrument 10 displays the address information obtained from the analysis of step 106 and allows the user to select an IP address that would be valid for the local segment. For example, the following information could be displayed to the user as dotted decimal notation commonly used in the industry for 32 bit IP addresses:

LAN test instrument IP: 128.001.002.___

The user is prompted to fill in the last three blanks of the LAN test instrument IP based on the local address range which, in this example, allows addresses from 0 to 255 for the last three digits. The IP address of the nearest router and the local subnet mask may also be provided to give further guidance to the user in making an initial selection of a desired IP address.

In step 110 labeled Check for Duplicate IP Addresses Between LAN Test Instrument and Local Subnet, the LAN test instrument 10 checks for a duplicate IP address between the desired source IP address entered by the user in step 108 and all addresses found in the LAN 12. To avoid corrupting the ARP caches of the devices connected to the local segment of the LAN 12, the LAN test instrument 10 first sends an ARP request with a predetermined unique source IP address and the target IP address of the desired source IP address entered by the user.

In this way, although the ARP caches of the other devices may be updated to include an entry for the unique IP address mapped to the MAC address of the LAN test instrument 10, there is no corruption for the entries of devices having a duplicate IP addresses as occur in the prior art methods. If there is no reply to the first ARP meaning there is no duplicate IP address, the LAN test instrument 10 then sends a second gratuitous ARP request with the desired IP address as the source and target address in order to fix the ARP caches of the other devices in order to correctly map to the desired source IP address that has been adopted by the LAN test instrument 10.

In step 112, labeled Duplicate Source IP Address?, if a duplicate IP address if found between the desired source IP address entered by the user and any address in the LAN 12, the method loops back to step 108 so that the user may be prompted for another source IP address. It would be desirable that an error message stating that there is a duplicate IP address be generated and displayed to the user to prevent confusion.

In step 114 labeled Determine Local Router and Subnet Mask, any routers connected to the local segment are also determined by the LAN test instrument 10. In this case the router 26 connected to the LAN SEGMENT 1 would be found and displayed to the user of the LAN test instrument 10. The local subnet mask would be determined according to appropriate ICMP and SNMP inquiries directed to the devices on the local subnet.

Referring now to FIG. 5B, in step 116 labeled ICMP Ping, the LAN test instrument 10 generates several broadcast pings. The ICMP Ping will request a response from all devices that respond to the limited broadcast (IP address 255.255.255.255) and to the subnet broadcast.

In step 118 labeled Dynamic Analysis which further comprises step 120 labeled Receive Device Responses, step 122 labeled Compare and Save Results in Data Base, and step 124 labeled Detect Duplicate IP Addresses. As each response arrives at the LAN test instrument at step 120, the address information is compared against past responses that have been stored in the data base to check for duplicate IP addresses in step 122. If the information contained in the response is new, such as a response from a newly found device on the LAN 12, the information is saved in the data base as a past response.

Responses from the devices connected to the LAN 12 are systematically collected and stored as past responses in order to build a more complete data base of the devices connected to the LAN 12. The responses are all analyzed the same way in the step 114 and the data base is built using the responses which are stored as past responses. The order in which the responses arrive is thus not critical because no information is lost as the data base accumulates unique information about the devices on the LAN 12 corresponding to the MAC and IP addresses contained in the responses. If identical IP addresses are found but the corresponding MAC addresses are different, step 124 detects the duplicate IP address. Additional device information from the information collected in the data base may be provided along with an error message alerting the user of the LAN test instrument 10 of the duplicate IP address.

The data base according to the present invention allows for more readily diagnosing duplicate IP addresses and more reliably communicating with the devices that have the duplicate IP addresses. Separate entries are maintained for each MAC address of the devices having duplicate IP addresses. These entries may be displayed to the user on the display 214, allowing the user to selectively and reliably communicate with selected devices having duplicate IP addresses using the keypad 216. In this way, misconfigured devices having duplicate IP addresses may be further diagnosed using directed commands to determine, for example, the device type and configuration of each selected device. Such information may be readily obtained in a conventional manner as long as the MAC and IP addresses of the selected device are known. The duplicate IP address in the selected device may be then corrected if necessary using remote commands to change the IP address of the selected device to a new IP address that is not a duplicate of any other IP address of the devices on the LAN 12.

Traditional ARP caches, on the other hand, do not allow for comparisons dynamically but are designed only for static retrieval which does not allow for detection of duplicate IP addresses. Furthermore, IP address and MAC address information may be lost because the duplicate IP information is overwritten as one associated entry.

In step 126 labeled Generate UDP Ping, the LAN test instrument 10 generates several broadcast UDP (User Datagram Protocol) pings. The UDP ping differs from the ICMP Ping of step 116 and may elicit responses from different devices that have not yet responded. The responses to the UDP ping are received and analyzed in the step 118 for duplicate IP addresses.

In step 128 labeled Generate SNMP Ping, the LAN test instrument 10 generates several broadcast SNMP ping requests. The SNMP broadcast ping request may elicit responses from different devices that have not yet responded. The responses to the SNMP pings are received and analyzed in the step 118 for duplicate IP addresses.

In step 130 labeled Generate ICMP Address Mask Request, the LAN test instrument 10 generates several ICMP broadcast mask requests. The ICMP mask request may elicit responses from different devices that have not yet responded. The responses to the ICMP broadcast mask requests are received and analyzed in the step 118 for duplicate IP addresses.

The steps 116, 126, 128, and 130 thus comprise the series of broadcast network requests. Each of the steps 116, 126, 128, and 130 are of different types of broadcast network requests which have been chosen through empirical experimentation to produce the responses from as many devices as practically possible given the current mix of device types found in a typical LAN 12. As the mix of device types changes over time and for different types and sizes of the LAN 12, the types represented by the steps 116, 126, 128, and 130 may change in number and composition based on reasonable experimentation.

In step 132 labeled Display Duplicate IP Addresses, any duplicate IP addresses that are found in the step 124 may be displayed to the user, along with additional diagnostic or error information. Such information is typically displayed numerical on a graphical user interface of the LAN test instrument 10.

In step 134 labeled End, the duplicate IP address detection method terminates. Duplicate IP detection according to the present invention may be set to return to step 104 to continually monitor for duplicate IP addresses on an on-going basis.

Figure 6:
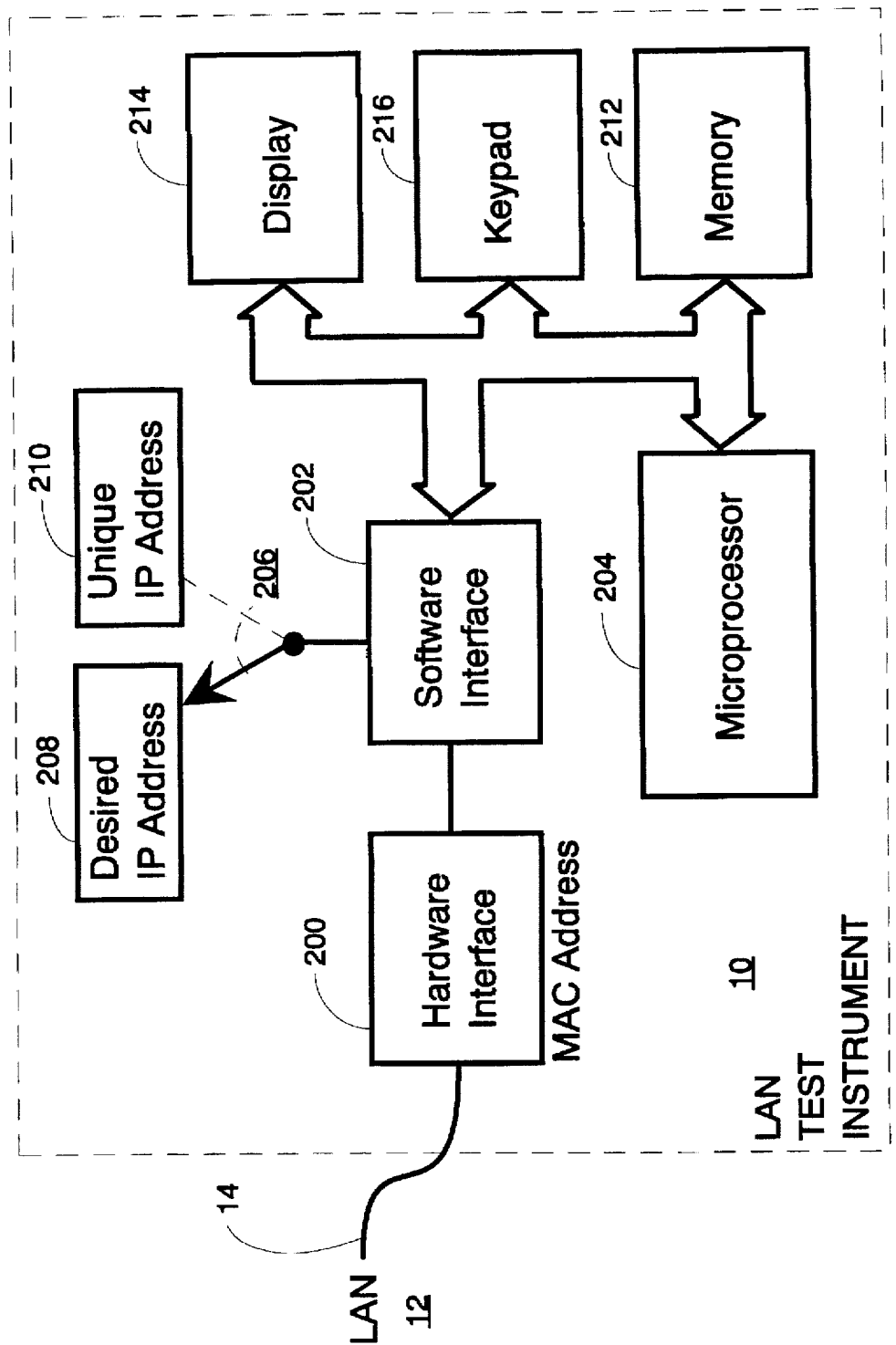
FIG. 6 is a simplified block diagram of the LAN test instrument according to the present invention.

In FIG. 6, there is shown a simplified block diagram of the LAN test instrument 10. A hardware interface 200 is coupled via the patch cord 14 to the LAN 12 in the well known manner. The hardware interface 200 operates in a similar manner to commonly available network adapters and may be adapted for connection to LANs that operate with Ethernet or Token Ring protocols. The hardware interface 200 has a MAC address assigned according to industry standards and may be assumed to be unique to the particular LAN test instrument 10. The hardware interface may be configured to selectively receive information that is targeted for the particular MAC address and the MAC broadcast address or, in promiscuous mode, to receive all information present on the local segment of the LAN 12.

A software interface 202 is coupled to receive the information provided by the hardware interface 200. The software interface 202 may be implemented as a stand-alone interface or it may be implemented entirely in software as executed by a microprocessor 204. The software interface 202 has a readily configurable IP address. A switch 206 provides for toggling between a desired IP address 208 as selected by the user and a unique IP address 210. The switch toggles between the desired IP address 208 and the unique IP address 210 during the step 110 shown in FIG. 5A when successive ARP requests are sent to check for duplicate IP addresses in a manner that avoids corrupting the ARP caches of other devices on the LAN 12.

The microprocessor 204 is coupled to the software interface 202 to send a series of network requests as performed in steps 112 and 122–128 to the devices in the LAN 12 and receive responses from the software interface 202 that are received back from the devices in the LAN 12 responsive to the network requests. The information received contains IP addresses and MAC addresses from the devices on the LAN 12. The microprocessor 204 dynamically compares the incoming IP addresses and MAC addresses with the IP addresses and MAC addresses stored in a data base in a memory 212 to detect duplicate IP addresses.

A display 214 and a keypad 216 comprise a user interface of the LAN test instrument 10. The LAN test instrument 10 prompts the user via the display 214 to enter the desired IP address 208 using the keypad 216 based on the subnet address ranges found on the local segment of the LAN 12. Duplicate IP addresses that are found can be displayed on the display 214.

It will be obvious to those having ordinary skill in the art that many changes may be made in the details of the above described preferred embodiments of the invention without departing from the spirit of the invention in its broader aspects. For example, the method according to the present invention may be readily adapted to different network protocols that allow for unique addressing of network devices. The series of broadcast network requests generated in the steps 116, 126, 128, and 130 need not be generated in the particular order as presented and the series may be readily adopted for greater or fewer such requests according to the composition of device types on the particular LAN being tested. Therefore, the scope of the present invention should be determined by the following claims.

What we claim as our invention is:

1. In a LAN test instrument for inserting into a LAN containing a plurality of devices having ARP caches, a method for configuring a desired IP address in said LAN test instrument without disrupting said LAN, comprising:

(a) monitoring data traffic in said LAN for a predetermined period of time;

(b) determining at least one local address range based on said data traffic;

(c) prompting a user for said desired IP address based on said local address range;

(d) generating an ARP request with a unique IP address as a source IP address and said desired IP address as a target IP address; and (e) if no reply is received from said devices, generating a second ARP request with said desired IP address as said source IP address and as said target address wherein said LAN test instrument is configured with said desired IP address without corrupting said ARP caches.

2. In a LAN test instrument for inserting into a LAN containing a plurality of devices having ARP caches, a method for configuring a desired IP address in said LAN test instrument without disrupting said LAN according to claim 1 wherein said LAN operates according to an Ethernet protocol.

3. In a LAN test instrument for inserting into a LAN containing a plurality of devices having ARP caches, a method for configuring a desired IP address in said LAN test instrument without disrupting said LAN according to claim 1 wherein said LAN operates according to a Token Ring protocol.

4. In a LAN test instrument for inserting into a LAN containing a plurality of devices having ARP caches, a method for configuring a desired IP address in said LAN test instrument without disrupting said LAN according to claim 1 further comprising:

(a) finding router IP addresses connected to said LAN;

(b) determining local subnet masks; and (c) prompting said user for said desired IP address based on said local subnet masks and said router IP addresses.

5. In a LAN test instrument for inserting into a LAN containing a plurality of devices, a method for detecting a duplicate IP address between any of said plurality of devices, comprising:

(a) generating a series of broadcast network requests;

(b) receiving responses from said devices according to said broadcast network requests, said responses containing IP addresses and MAC addresses corresponding to said devices;

(c) dynamically comparing said responses to past responses stored in a data base;

(d) maintaining separate entries in said data base for each of said devices having said duplicate IP address;

(e) detecting said duplicate IP address if said IP addresses of said responses match said IP addresses of said past responses and said MAC addresses do not match a corresponding MAC address of said past responses;

(f) generating an error message for said duplicate IP address.

(g) selecting one of said separate entries; and (h) selectively communicating with one of said devices corresponding to said one of said separate entries.

6. In a LAN test instrument for inserting into a LAN containing a plurality of devices, a method for detecting a duplicate IP address according to claim 5 further comprising:

(a) diagnosing said one of said devices; and (b) correcting said duplicate IP address in said one of said devices.

7. In a LAN test instrument for inserting into a LAN containing a plurality of devices, a method for detecting a duplicate IP address according to claim 5 wherein said series of network requests contains a plurality of types chosen to elicit said responses from a maximum number of said devices.

8. In a LAN test instrument for inserting into a LAN containing a plurality of devices, a method for detecting a duplicate IP address according to claim 7 wherein said types comprise ICMP pings, UDP pings, and SNMP pings.

* * * * *